(12) United States Patent
Ecker

(10) Patent No.: US 6,379,137 B1
(45) Date of Patent: Apr. 30, 2002

(54) DEVICE FOR FEEDING STRANDS OF MOLTEN SYNTHETIC MATERIAL THAT ARE ISSUED FROM NOZZLES TO A DISCHARGE CHUTE

(75) Inventor: Andreas Ecker, Nürtingen (DE)

(73) Assignee: Rieter Automatic GmbH (DE)

( * ) Notice: Subject to any disclaimer, the term of this patent is extended or adjusted under 35 U.S.C. 154(b) by 0 days.

(21) Appl. No.: 09/831,492

(22) PCT Filed: Sep. 13, 2000

(86) PCT No.: PCT/EP00/08951

§ 371 Date: Jul. 18, 2001

§ 102(e) Date: Jul. 18, 2001

(87) PCT Pub. No.: WO01/19581

PCT Pub. Date: Mar. 22, 2001

(30) Foreign Application Priority Data

Sep. 13, 1999 (DE) .......................................... 199 43 754

(51) Int. Cl.[7] ............................................... B29C 47/88
(52) U.S. Cl. .............................. 425/71; 425/67; 425/69; 425/315; 425/215
(58) Field of Search .......................... 425/71, 315, 316, 425/72.2, 215, 67, 69; 264/143

(56) References Cited

U.S. PATENT DOCUMENTS

| | | | | |
|---|---|---|---|---|
| 4,025,252 A | * | 5/1977 | Hunke | .......................... 425/308 |
| 4,192,635 A | * | 3/1980 | Hunke et al. | ................ 425/308 |
| 4,528,157 A | * | 7/1985 | Lettner et al. | ............... 264/143 |
| 5,118,270 A | * | 6/1992 | Keilert et al. | ............... 425/308 |
| 5,441,394 A | * | 8/1995 | Keilert et al. | ............ 264/178 F |
| 5,863,564 A | | 1/1999 | Yoon | |
| 5,888,554 A | | 3/1999 | Zollitsch et al. | |

FOREIGN PATENT DOCUMENTS

| | | | |
|---|---|---|---|
| DE | 2 230 187 A | * | 6/1972 |
| DE | 44 14 753 | | 11/1995 |
| EP | 0 086 400 | | 2/1983 |

* cited by examiner

*Primary Examiner*—Nam Nguyen
*Assistant Examiner*—Brian L. Mutschler
(74) *Attorney, Agent, or Firm*—Banner & Witcoff, Ltd.

(57) ABSTRACT

The invention relates to a device for feeding molten plastic extrudates which emerge from dies to a discharge channel having a cooling water inlet which follows the dies, in which device the dies are arranged in at least two rows, in such a manner that in the discharge direction strands from one row and the other row are guided alternately, next to and at a distance from one another, in which device two collection channels, which are arranged one above the other, are interposed between the dies and the discharge channel, in such a manner that the extrudates emerging from one row of dies are in each case fed to the discharge channel as a group via a collection channel, the individual extrudates of the two groups meeting one another in an intermeshing position alternately and next to one another on the discharge channel and being guided onward by the latter.

4 Claims, 6 Drawing Sheets

DEVICE FOR FEEDING STRANDS OF MOLTEN SYNTHETIC MATERIAL THAT ARE ISSUED FROM NOZZLES TO A DISCHARGE CHUTE

The invention relates to a device for feeding molten plastic extrudates which emerge from dies to a discharge channel having a cooling water inlet which follows the dies, in which device the dies are arranged in at least two rows, in such a manner that in the discharge direction extrudates from one row and the other row are guided alternately, next to and at a distance from one another.

A device of this type is known from DE 26 55 840 A1. In this device, the extrudates from two rows of dies which lie parallel and next to one another are guided via an arrangement of discharge channels in which the extrudates from in each case one row of dies are fed to an associated discharge channel and the two discharge channels are arranged back to back with respect to one another. In order to provide the extrudates with the necessary guidance, the discharge channels each form an outwardly directed, rounded projection onto which the extrudates are pulled. At their lower end, the discharge channels are brought together, so that the extrudates come together next to one another in such a manner that in an intermeshing position, i.e. arranged alternately next to one another with regard to their associated row, they are passed onward to a pelletizer with a relatively short distance between them.

The invention is based on the object of making it possible to apply the principle of bringing together extrudates which ultimately lie relatively closely adjacent to one another in a device in which the plastic extrudates are guided via a single, sloping discharge channel.

This object is achieved, in conjunction with the preamble of patent claim 1, in that two collection channels, which are arranged one above the other, are interposed between the dies and the discharge channel, in such a manner that the extrudates emerging from one row of dies are in each case fed to the discharge channel as a group via one of the collection channels, the individual extrudates of the two groups meeting one another in an intermeshing position alternately and next to one another on the discharge channel and being guided onward by the latter.

On each of the two collection channels, the extrudates as a group are immediately superficially cooled by the corresponding cooling water inlet, so that after they leave the collection channels the extrudates can no longer stick to one another. The device according to the invention takes advantage of this in that, on account of the arrangement of the dies, initially on each collection channel the extrudates are guided as a group at a distance which prevents them from sticking to one another. However, since the dies of one row of dies are arranged offset with respect to the dies belonging to the other row of dies, the extrudates which are supplied from each collection channel and are relatively well spaced apart from one another come together on the discharge channel, with the distance between them which was previously maintained on the respective collection channel being reduced by half; however, on account of the cooling of their surfaces which has taken place in the meantime, this does not cause any problems and the extrudates are reliably prevented from sticking to one another on the discharge channel. However, the discharge channel can now carry twice the number of extrudates closely adjacent to one another compared to each collection channel, i.e. given the same width of discharge channel compared to the known device it is now possible for the discharge channel to guide twice the number of extrudates next to one another, with the result that the throughput of the device according to the invention with only one discharge channel is doubled compared to the known discharge channel arrangement, without the discharge channel having to be widened. This of course has an equally beneficial effect on the pelletizer, which is likewise able to process twice the number of extrudates without its width having to be increased.

To prevent further processing of extruded material which has been supplied from the dies and has not yet reached the required quality for further processing, the device is expediently configured in such a way that each collection channel is arranged so that it can be displaced between an operating position, in which the extrudates are collected by a collection channel and a start-up position, in which the extrudates are guided adjacently past the collection channel in question. Only when extruded material which is of a suitable quality for processing is supplied is this material, following displacement of the collection channels into the operating position, collected and supplied to the discharge channel for further processing.

The separation between extruded material which can be processed and extruded material which cannot be processed is facilitated by the fact that at least one collection channel is assigned a separating element which, when displaced through the drop line of the extrudates into the operating position, takes hold of the extrudates and then severs them. This type of separation of extruded material is referred to in EP 0 086 400 B1. A particular configuration of the device with a separating element which covers the dies advantageously consists in the fact that a separating element which covers the dies is provided above the uppermost collection channel, which separating element, during displacement from the operating position into the start-up position, severs the extrudates and, by means of a diverter element, guides the extrudates which continue to emerge away from the collection channels. The diverter element ensures that the extrudates made from material of insufficient quality are reliably diverted away from the device.

Exemplary embodiments of the invention are illustrated in the figures, in which:

BRIEF DESCRIPTION OF DRAWING

FIG. 1 shows the die block 13 with the four rows of dies 16, 17, 18 and 19, which each have a number of dies 20, to illustrate which a perspective view in the region of the die block 13 has been selected. The arrangement of the dies 20 in the rows of dies 16–17 can also be seen from FIG. 2.

Figure 1:
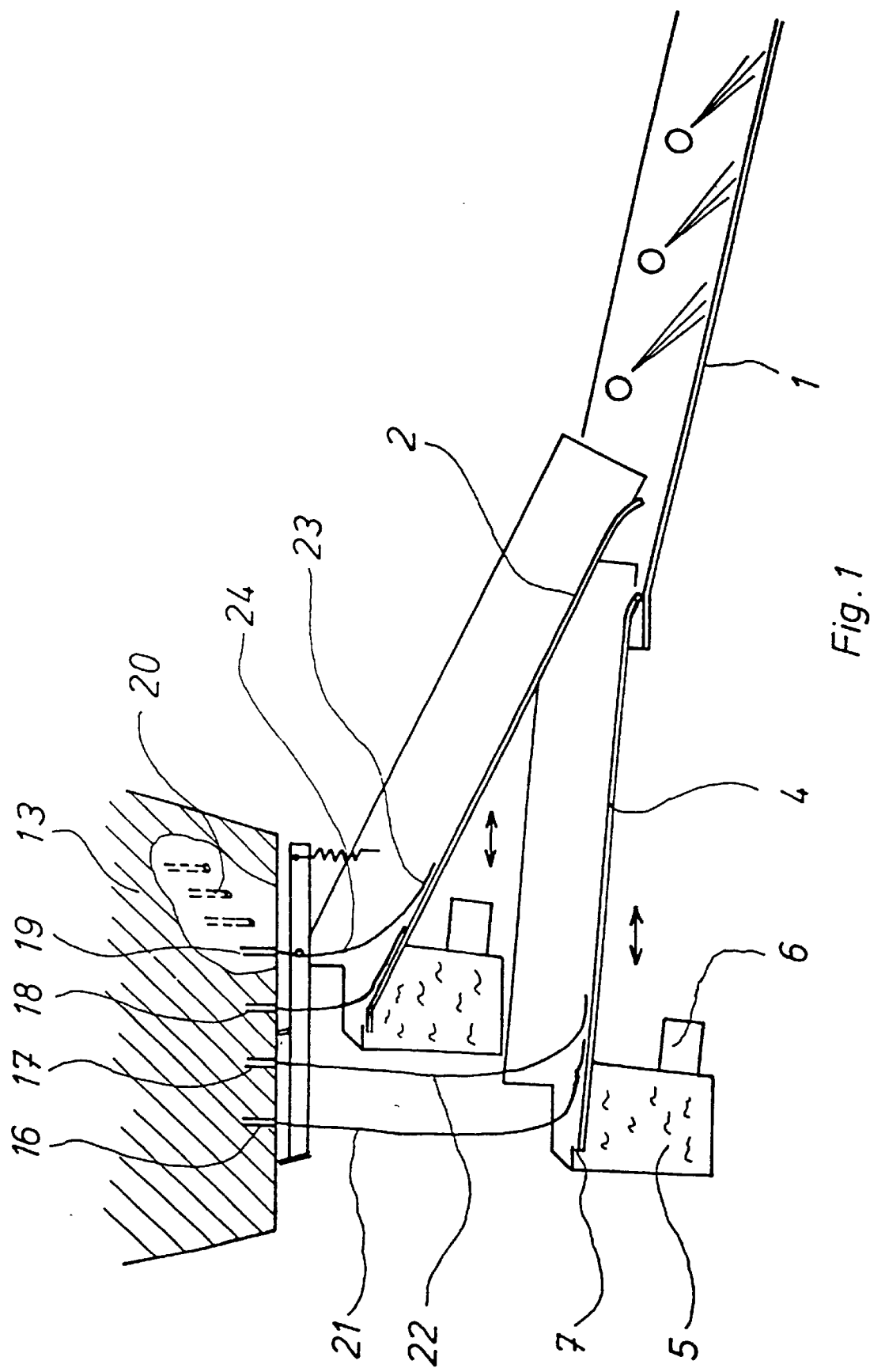
FIG. 1 shows an outline illustration of a side view of the device.

The dies 20 belonging to the rows of dies 16 and 17 deliver the molten extrudates 21 and 22, and the dies belonging to the rows of dies 18 and 19 deliver the molten extrudates 23 and 24. The extrudates 21 and 22 are collected by the displaceable collection channel 4, which is arranged so that it can be displaced to and fro in the horizontal direction, as indicated by the double arrow in the drawing. The collection channel 4 opens into the discharge channel 1. The collection channel also contains the water reservoir 5, to which cooling water is supplied via the inlet 6, which cooling water is fed, through the slot 7 in the water tank 5, to that part of the collection channel 4 which collects the extrudates 21 and 22. The cooling water runs over the bottom of the collection channel 4, entraining the extrudates 21 and 22 toward the discharge channel 1, during which process it cools the surfaces of the collected extrudates 21 and 22, so that they are transferred to the discharge channel at the end of the collection channel 4 in a state in which, despite being arranged relatively close together on the discharge channel 1, they cannot stick to one another. On the collection channel 4, the extrudates 21 and 22 run at a distance from one another which is such that they cannot come into contact with one another.

A similar arrangement applies to the extrudates 23 and 24 on the collection channel 2.

The extrudates 23, 24 and 21, 22 which have been picked up by the collection channels 2 and 4, which are of substantially equal length, are passed from the collection channels to the discharge channel 1, on which the extrudates are guided onward, together with the cooling water which has been supplied to the collection channels 2 and 4, and ultimately passed into a pelletizer (not shown). With regard to this further function, in particular the discharge channel 1, reference is made to EP 0 086 400 B1.

The arrangement of the dies 20 in the rows of dies 16, 17, 18 and 19 results in the extrudates being guided in such a way that, as explained in more detail below, it is ensured that the extrudates are guided particularly close together on the discharge channel 1. This will be explained with reference to FIG. 2.

Figure 2:
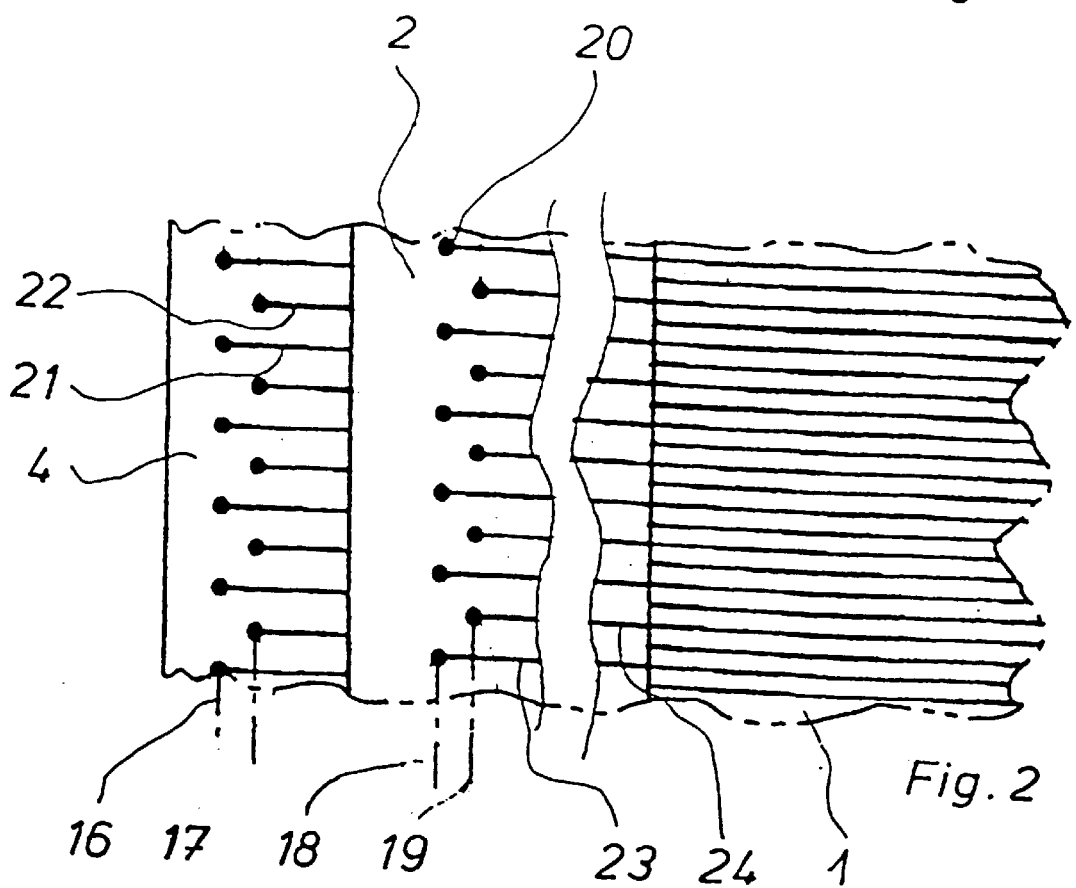
FIG. 2 shows a plan view of the two collection channels in their operating position, each collection channel being fed from two rows of dies.

FIG. 2 diagrammatically depicts the arrangement of the rows of dies 16, 17 and 18, 19 together with the dies 20, the rows of dies 16 and 17 passing the extrudates 21 and 22 supplied from the dies to the collection channel 4 as a group, only a section of the collection channel 4 being illustrated in this figure. The dies 20 belonging to the rows of dies 18 and 19 supply their extrudates 23 and 24 to the collection channel 2 as a further group. Since the collection channel 2 is situated above the collection channel 4 (cf. FIG. 1), the extrudates 21 and 22, as they are passed onward, initially disappear beneath the collection channel 2 until they reappear below the collection channel 2, where they meet the extrudates 23 and 24 as they pass onto the discharge channel 1. As is clearly shown in FIG. 2, the individual dies 20 are arranged in such a way that the extrudates running on a collection channel 2 or 4 initially maintain a distance which is such that they do not touch one another and therefore also cannot stick to one another. Only when all the extrudates come together on the discharge channel 1 does the interleaved arrangement of the dies 20 in the individual rows of dies 16–19 lead to a uniform closely packed arrangement in which the extrudates could come into contact with another under certain circumstances, although this can no longer lead to the extrudates sticking together, since the extrudates have been sufficiently cooled on their surfaces on account of being guided over the upstream collection channels 2 and 4. The result is a particularly closely packed guidance of extrudates on the discharge channel 1. The discharge channel 1 and therefore also a downstream pelletizer can therefore be optimally utilized for extrudate guidance and pelletizing of the extrudates with regard to the width available.

Figure 3:
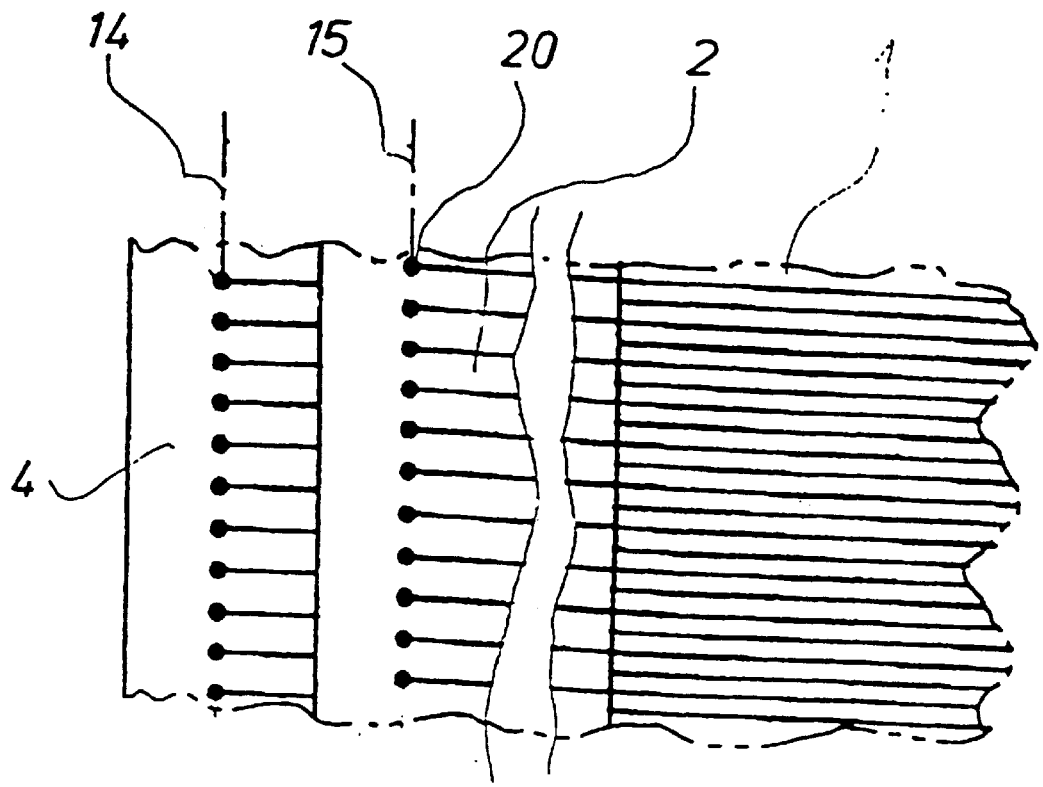
FIG. 3 shows an illustration which corresponds to that shown in FIG. 2, but with in each case one collection channel being fed by one row of dies.

FIG. 3 shows a variant on the arrangement of dies illustrated in FIG. 2. In accordance with FIG. 3, there are only two rows of dies 20, namely the two rows 14 and 15, which in a similar manner to the arrangement shown in FIG. 2 supply the extrudates which they have delivered, as a group, on the associated collection channel 2 or 4, respectively, at a sufficient distance from one another. After the extrudates have been brought together on the discharge channel 1, the closely packed extrudate guidance which has already been shown in FIG. 2 then results, leading to the same result as the extrudate guidance shown in FIG. 2. Of course, the arrangement of the dies shown in FIG. 3 can also readily be employed in a device as shown in FIG. 1.

Figure 4:
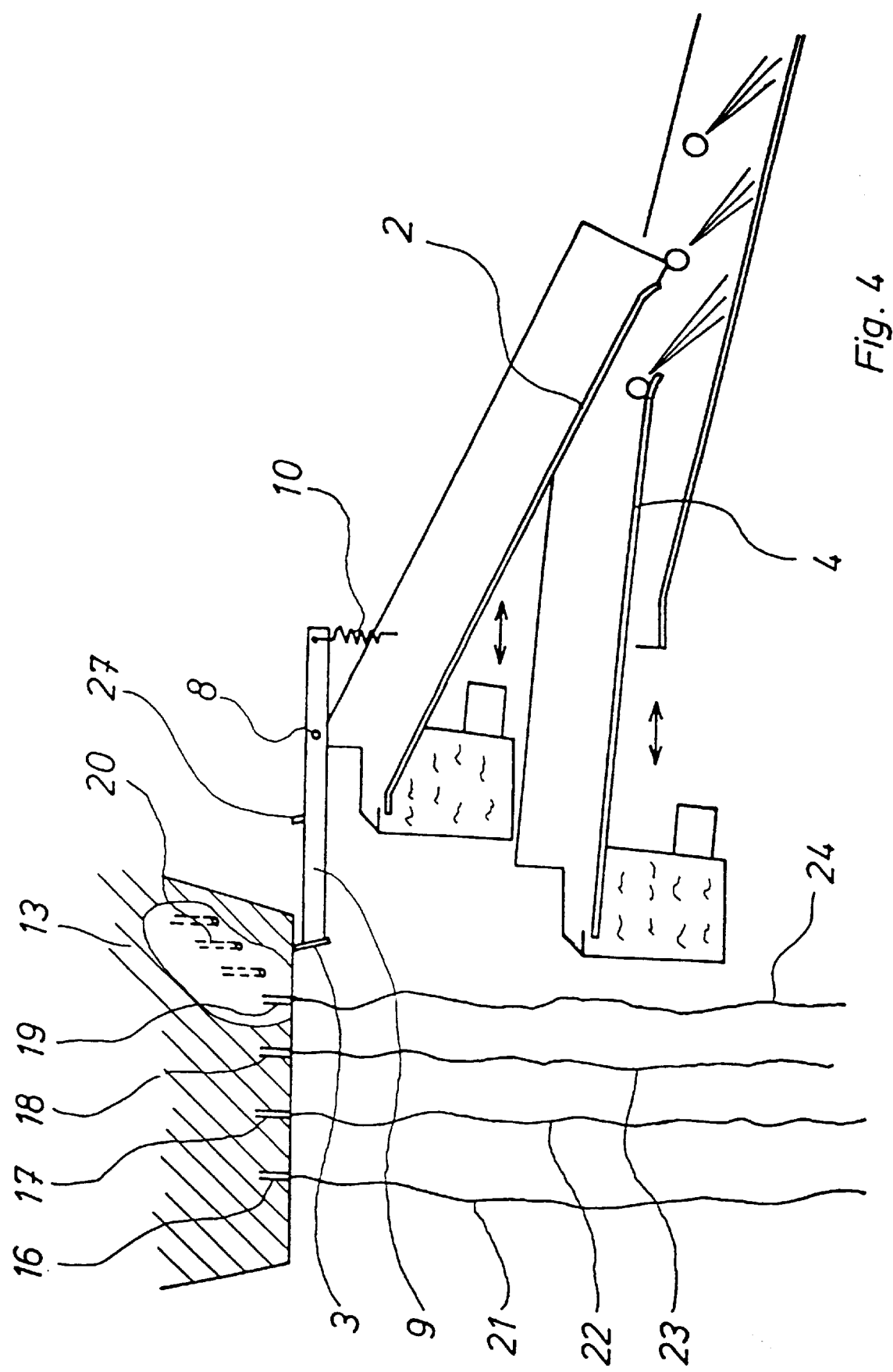
FIG. 4 shows the device shown in FIG. 1 with the two collection channels in the start-up position, in which the extrudates drop freely next to the collection channels.

A particular feature of the device according to the invention, which consists in the fact that the collection channels 2 and 4 can be displaced in the horizontal direction as indicated by the corresponding double arrow at the collection channels 2 and 4, will now be explained on the basis of FIG. 4 and referring back to FIG. 1. The collection devices 2 and 4 can each be displaced from an operating position into a start-up position and vice versa. In the operating position, as illustrated in FIG. 1, the collection channels 4 and 2 collect the respectively associated extrudates from the rows of dies 16, 17 and 18, 19 and, in the manner described above, pass them to the discharge channel 1. Now, in order to initially keep molten plastic material which, as is customary, initially does not yet have the properties required for subsequent further processing, away from the device when starting up a device of this type, the possibility of displacement indicated by the double arrows is provided. In this context, reference is made to EP 0 086 400 B1, in which the utilization of a possibility of displacement of this nature is dealt with in particular detail in connection with a single discharge channel and in which the components required for producing the possibility of displacement are shown. Starting from the operating position illustrated in FIG. 1, the two collection channels 2 and 4 can be displaced into the start-up position which is illustrated in FIG. 4 and in which the extrudates emerging from the dies 20 drop down freely next to the collection channels 2 and 4 and therefore cannot pass into the discharge channel 1. This extruded material which therefore drops down without being processed, during the abovementioned start-up of the device, represents the initially unusable material which can then be disposed of in a manner which is of no interest in this context. When, after a known start-up time, the extruded material emerging from the dies 20 has reached the property required for further processing, the two collection channels 2 and 4 in this example are simultaneously displaced into the operating position illustrated in FIG. 1, the separating elements 3 and 27 which are connected to the collection channel 2 sliding over the dies 20 and thus severing the emerging extrudates. The severed extrudates drop down and are collected separately until the collection channel 2 has reached its final operating position as shown in FIG. 1, in which then all the extrudates are collected by the associated collection channels 2 and 4 and are passed onward.

The arrangement illustrated in FIG. 4 may also operate in such a way that the two separating elements 3 and 27 are arranged in such a manner that they can be displaced separately from one another. It is thus possible, after severing of the extrudates of extrudate rows 18 and 19 which have emerged from the dies 20, initially to move the collection channel 2 into the operating position. Then, after the extrudates of extrudate rows 16 and 17 emerging from the dies 20 have been severed, the collection channel 4 is moved into the operating position. This start-up variant has the advantage that the downstream pelletizer (not shown here) is not immediately operated at full load. The shut-down process takes place in a corresponding, reverse order.

The separating elements 3 and 27 are in this case a type of blade which passes over the planar surface of the die block 13. The blades 3 and 27 are attached to the end of the lever 9 which can rotate about the pin 8. At its ends which are remote from the blades 3 and 27, the lever 9 is pressed by the tension spring 10, which is attached to the collection channel 2, against the surface of the die block 13, thus ensuring smooth severing of the strands as soon as they emerge from the dies 20.

Figure 5:
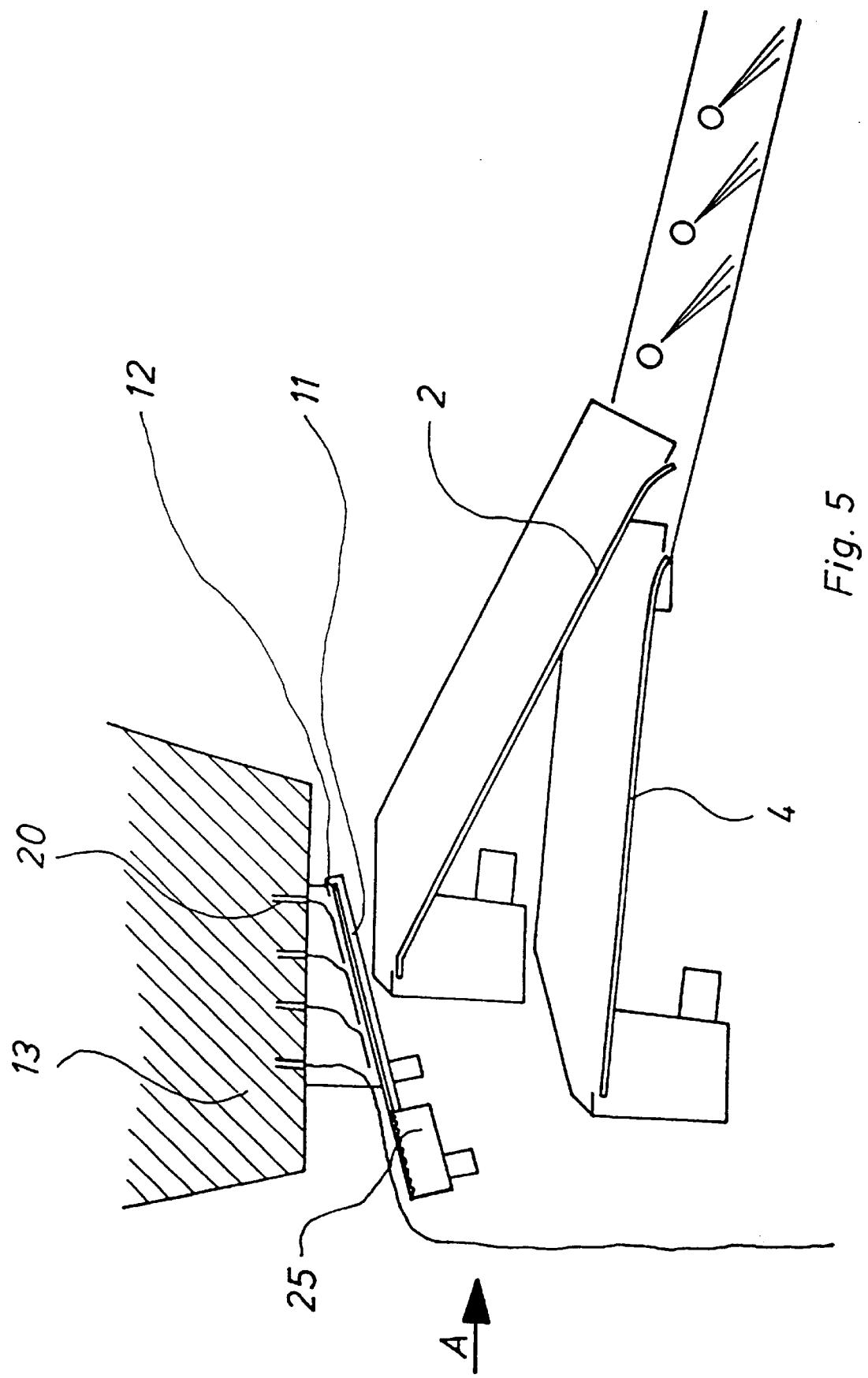
FIG. 5 shows a device with a separating element for separating off and removing the extrudates emerging from the dies, laterally past the collection channels.
Figure 6:
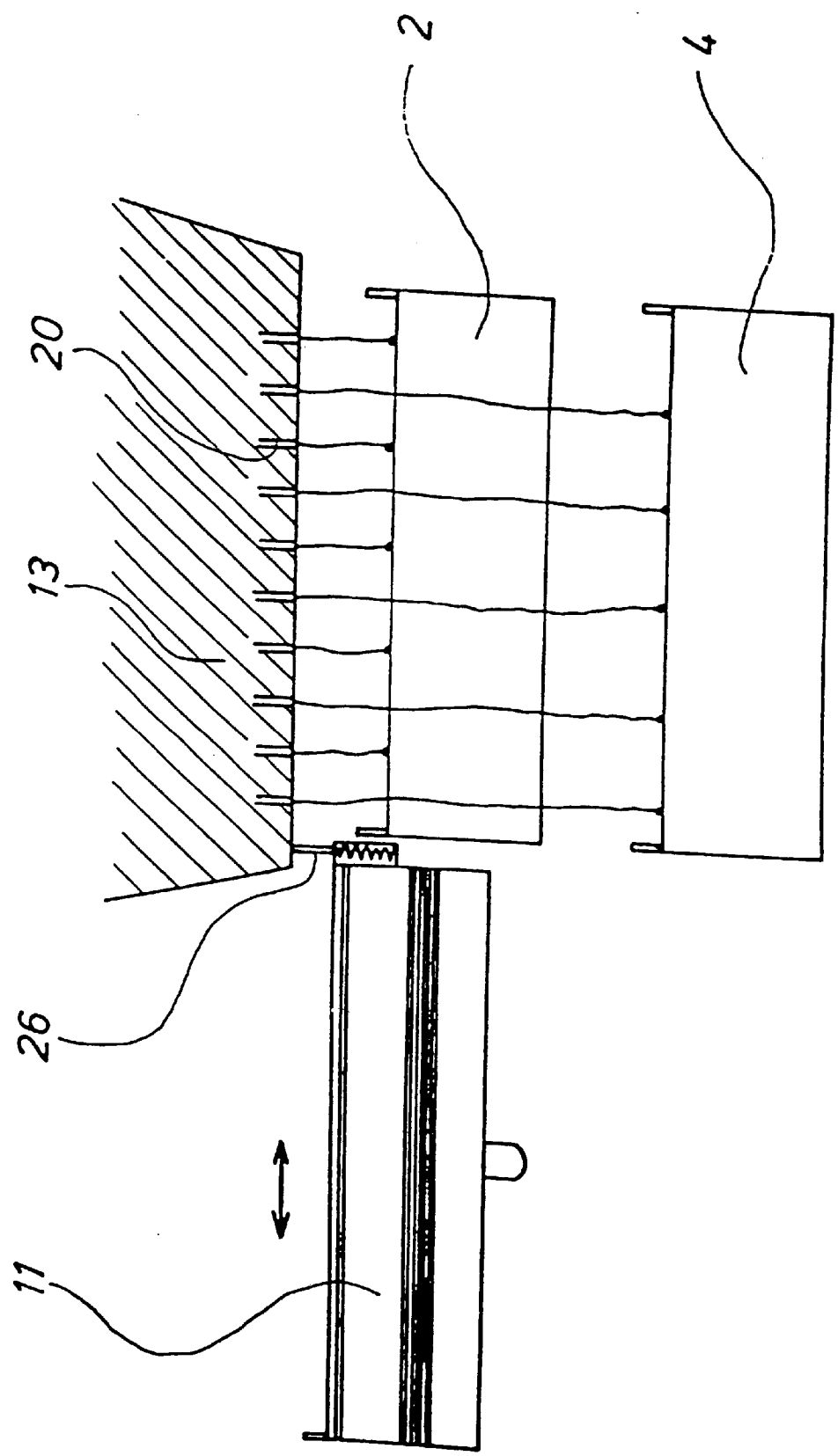
FIG. 6 shows the device in accordance with FIG. 5 with an extended separating element (operating position), the extrudates entering the collection channels.
Figure 7:
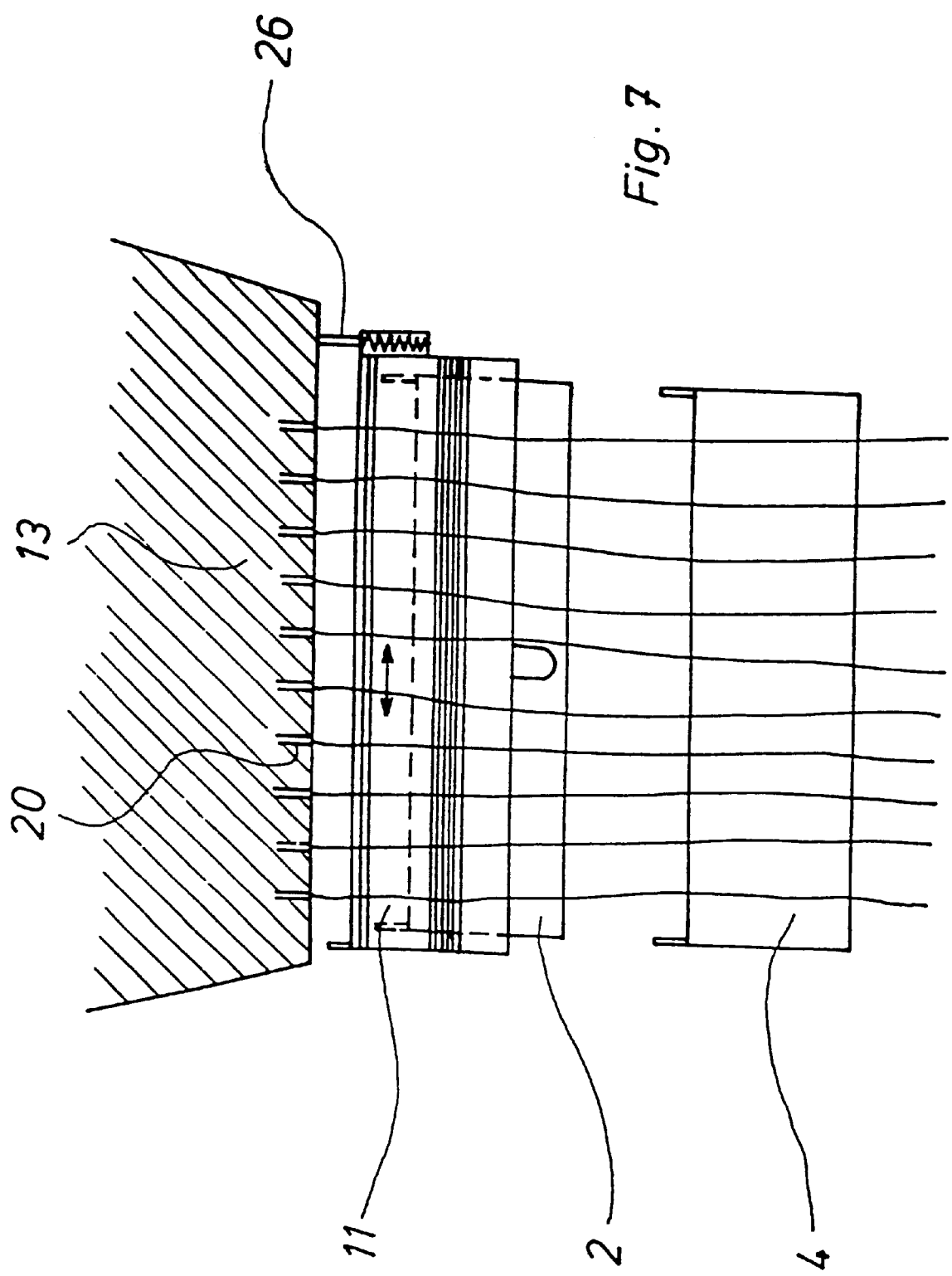
FIG. 7 shows the arrangement in accordance with FIG. 1 with a separating element which has been pushed under the extrudates and with the extrudates being diverted away (start-up position).

A particular way of diverting away extruded material in the start-up position is illustrated in FIGS. 5 to 7. In accordance with FIG. 5, the device has the diverter element 11, which comprises an inclined plate which can optionally be pushed under the dies 20. In FIG. 5, the diverter element 11 is illustrated in the position in which it collects and laterally diverts away the extrudates emerging from the dies 20. So that the extrudates do not stick to the diverter element, this element is provided, in a similar manner to the collection channels, with a water overflow 12, from which cooling water is guided over the diverter element 11. To allow the water to be discharged without problems, a suction device 25 is provided at the end of the diverter element 11, which device, in a known way, takes up and guides away the water flowing off the diverter element. When usable extruded material then emerges from the die block 13, the diverter element is pushed away, so that the extrudates can then be passed onto the collection channels, as explained above. The diverter element 11 is shown in its operating position in FIG. 6. It has been pushed laterally out of the device and, by means of its blade 26 which serves as separating element, is pressing against the surface of the die block 13. To move into the start-up position, the diverter element 11 is pushed over the dies 20, transversely with respect to the extrudates, so that the emerging extrudates are severed and the extrudates which continue to emerge are then collected by the diverter element.

This is illustrated in FIG. 7. In accordance with FIG. 7, the diverter element 11 is in the start-up position, in which the extrudates emerging from the dies 20 are guided away by the diverter element 11 sufficiently far for the extrudates to be able to be guided past the collection channels 2 and 4. During the subsequent transfer into the operating position, the blade 26 then slides past the surface of the die block 13 and therefore the dies 20, with the emerging extrudates being cut off, so that the extrudates of usable material which then follow can drop onto the two collection channels and can thus be passed onward for further processing.

What is claimed is:

1. Device for feeding molten plastic extrudates (21, 22, 23, 24) which emerge from dies (20) to a discharge channel (1) having a cooling water inlet (7) which follows the dies (20), in which device the dies (20) are arranged in at least two rows (14, 15; 16, 17, 18, 19), in such a manner that in the discharge direction extrudates from one row and the other row are guided alternately, next to and at a distance from one another, characterized in that two collection channels (2, 4), which are arranged one above the other, are interposed between the dies (20) and the discharge channel (1), in such a manner that the individual extrudates (21, 22, 23, 24) emerging from one row (14, 15; 16, 17, 18, 19) of dies are in each case fed to the discharge channel (1) as a group via one of the collection channels (2, 4), the individual extrudates (21, 22, 23, 24) of the two groups meeting one another in an intermeshing position alternately and next to one another on the discharge channel (1) and being guided onward by the latter.

2. Device according to claim 1, characterized in that each collection channel (2, 4) is arranged so that it can be displaced between an operating position, in which said individual extrudates are collected by a collection channel (2, 4), and a start-up position, in which the individual extrudates (21, 22, 23, 24) are guided adjacently past the collection channel (2, 4).

3. Device according to claim 1, characterized in that at least one of said collection channels (2, 4) is assigned a separating element (3, 27) which, when displaced through the drop line of the individual extrudates (21, 22, 23, 24) into the operating position, takes hold of the individual extrudates and then severs them.

4. Device according to claim 1, characterized in that a separating element (3) which covers the dies (20) is provided above the uppermost collection channel (2), which separating element, during displacement from the operating position into the start-up position, severs the individual extrudates (21, 22, 23, 24) and, by means of a diverter element (11), guides the individual extrudates which continue to emerge away from the collection channels (2, 4).

* * * * *